(12) United States Patent  
Ferlitsch

(10) Patent No.: US 7,456,989 B2
(45) Date of Patent: Nov. 25, 2008

(54) SYSTEMS AND METHODS FOR PROVIDING A VENDOR CONTROL INTERFACE FOR AN IMAGING DEVICE

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 913 days.

(21) Appl. No.: 10/994,961

(22) Filed: Nov. 22, 2004

(65) Prior Publication Data

US 2006/0114489 A1 Jun. 1, 2006

(51) Int. Cl.
*G06F 3/12* (2006.01)
*G06K 15/00* (2006.01)

(52) U.S. Cl. .............. 358/1.15; 358/1.14; 358/1.13

(58) Field of Classification Search ............ 358/1.1, 358/1.2, 1.3, 1.4, 1.5, 1.6, 1.9, 1.11, 1.12, 358/1.13, 1.14, 1.15, 1.16, 1.17, 1.18, 400, 358/401, 407, 468, 474; 347/2, 3, 5; 705/52; 382/100; 399/1, 2, 8, 9, 23, 24, 79, 80
See application file for complete search history.

(56) References Cited

U.S. PATENT DOCUMENTS 5,637,845 A * 6/1997 Kolls ..................... 235/381
5,956,698 A * 9/1999 Lacheze et al. ............... 705/34
6,026,380 A 2/2000 Weiler et al.
6,119,934 A 9/2000 Kolls
6,216,113 B1 4/2001 Aikens et al.
6,452,689 B1 9/2002 Srinivasan
2002/0175208 A1 11/2002 Bartley et al.
2003/0074312 A1 4/2003 White

FOREIGN PATENT DOCUMENTS

EP          1 302 884      4/2003
JP         09-212051       8/1997
WO        WO-96/18980     6/1996

\* cited by examiner

*Primary Examiner*—Dov Popovici
(74) *Attorney, Agent, or Firm*—Madson & Austin

(57) ABSTRACT

Systems and methods for providing a vendor control interface for an imaging device are disclosed. An exemplary system includes an imaging device. The imaging device includes a processor and memory in electronic communication with the processor. The imaging device also includes a vendor interface for enabling a pay-per-use device to be connected to the imaging device. The vendor interface is in electronic communication with the processor. The vendor interface includes an input generating control that enables and disables input generating operations. The vendor interface also includes an output generating control that enables and disables output generating operations. An input counting control is included for counting the number of input generating impressions. The vendor interface further includes an output counting control for counting the number of output generating impressions.

22 Claims, 10 Drawing Sheets

Start Operation

Stop Operation

Start Operation

Stop Operation

Start Operation

Stop Operation

Start Operation

Stop Operation

SYSTEMS AND METHODS FOR PROVIDING A VENDOR CONTROL INTERFACE FOR AN IMAGING DEVICE

TECHNICAL FIELD

The present invention relates generally to imaging devices. More specifically, the present invention relates to systems and methods providing a vendor control interface for an imaging device.

BACKGROUND

Imaging devices are frequently used in many aspects of business, industry and academic endeavors. The term "imaging," as used herein, should be interpreted broadly to include any process for producing a copy of a document onto paper, a computer screen, an electronic image, or the like. Examples of imaging devices include printers, facsimile devices, copiers, scanners, display monitors, multi-function peripherals (MFPs), imagesetters, platesetters, filing devices, web publishing devices, and so forth. Documents which are sent to a printing device for printing are sometimes referred to as print jobs.

Printers (one kind of imaging device) are used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print. Many imaging devices can generate scanned image data. For example, some imaging devices include scanners which can scan a document to provide scanned image data. It is also possible that an imaging device may be able to read scanned image data from a storage device. There may also be other ways in which an imaging device may be provided with or otherwise obtain scanned image data. Copiers and facsimile devices are also commonly used imaging devices.

In certain computing environments, it is desirable to track information that relates to each task performed at the imaging device. The information that is tracked may be used for a variety of reasons. One use of tracking information is to determine the cost and administer a pay-per-use system along with the imaging device. In some libraries and universities, imaging devices have some type of pay-per-use device attached to the imaging device to facilitate payment for any copies before copies are made.

When a pay-per-use operator places an imaging device for pay-per-use access, the operator often desires a single means for implementing the pay-per-use interface to the imaging device for all imaging operations. Traditionally, pay-per-use has been limited to walkup copier devices. These copiers are controlled by an external coin-operated (or other access control box) box that interfaces with a vendor specific interface on the device. Most pay-per-use systems are not able to track all types of functions that may be performed by the imaging device. In addition, many are unable to provide sufficient detail with respect to measuring the amount of use. Therefore, there is a desire for a more effective system and method for providing a vendor interface for an imaging device to administer a pay-per-use system.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
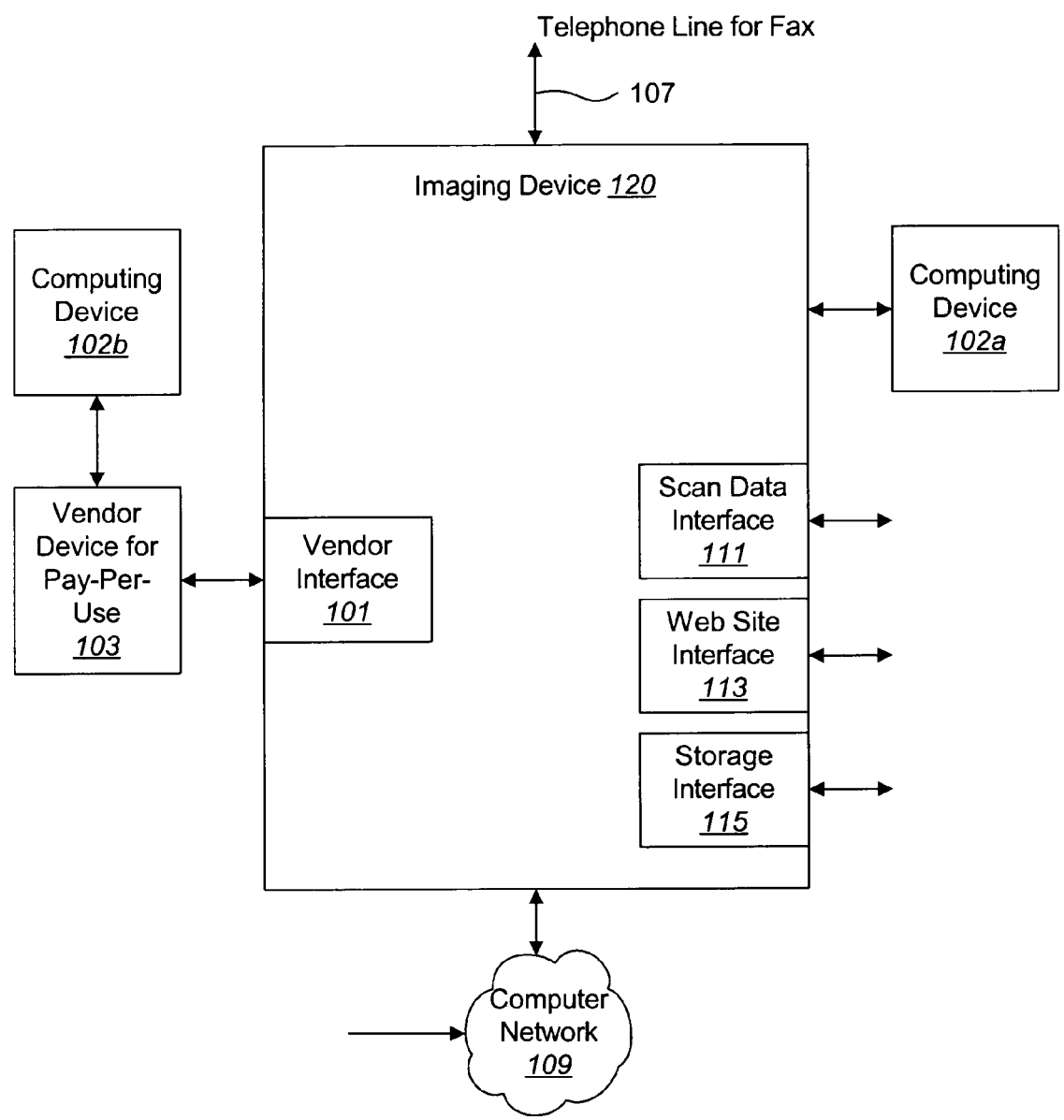
FIG. 1 is a block diagram illustrating an embodiment of the vendor interface of an imaging device.

Systems and methods for providing a vendor control interface for an imaging device are disclosed. An exemplary system includes an imaging device. The imaging device includes a processor and memory in electronic communication with the processor. The imaging device also includes a vendor interface for enabling a pay-per-use device to be connected to the imaging device. The vendor interface is in electronic communication with the processor. The vendor interface includes an input generating control that enables and disables input generating operations. The vendor interface also includes an output generating control that enables and disables output generating operations. An input counting control is included for counting the number of input generating impressions. The vendor interface further includes an output counting control for counting the number of output generating impressions.

There are different kinds of imaging devices that may be used with the systems and methods herein. For example, the imaging device may be a printer, a facsimile device, a copier, a scanner, a display monitor, an imagesetter, a platesetter, an image store, a publishing device, and a multi-function peripheral device.

In one embodiment the imaging device may be a scanner. The memory may include instructions to implement a method that includes receiving an on signal on the input generating control. The scanner is enabled. Output is provided on the input counting control for counting a number of scan impressions. An off signal is received on the input generating control and the scanner is disabled.

In another embodiment instructions may be stored in the memory to implement a method for use with a raster image processor (RIP) in a print controller. An on signal is received on the input generating control. The raster image processor is enabled. Output is provided for counting a number of generated RIP impressions. An off signal is received on the input generating control and the raster image processor is disabled.

In another embodiment instructions may be stored in the memory to implement a method for use with a print engine. An on signal is received on the input generating control. The print engine is enabled. Output is provided for counting a number of print impressions. An off signal is received on the input generating control and the print engine is disabled.

Instructions may be stored in the memory to implement a method for use with an image transmission. An on signal is received on the input generating control. The image engine is enabled. Output is provided for counting a number of transmitted images. An off signal is received on the input generating control and the image engine is disabled.

Another embodiment may include instructions stored in the memory to implement a method for use with a copy operation. An on signal is received on the input generating control to allow hard-copy input to be scanned. An on signal is received on the output generating control to allow printed material to be generated. Output is provided on the input counting control for counting a number of input documents. Output is also provided on the output counting control for counting a number of printed pages.

In a still yet further embodiment, instructions may be stored in the memory to implement a method for use with a print operation where print data is input and paper is output. An on signal is received on the input generating control to allow print data to be inputted. An on signal is received on the output generating control to allow printed material to be generated. Output is provided on the input counting control for counting a number of input documents. Output is also provided on the output counting control for counting a number of printed pages.

Further embodiments may include instructions stored in the memory to implement a method for a paper in-image out operation. An on signal is received on the input generating control to allow hard-copy input to be scanned. An on signal is received on the output generating control to allow scanned data to be converted to a data format and stored or transmitted. Output is provided on the input counting control for counting a number of input documents. Output is also provided on the output counting control for counting the size of the output.

Instructions may be stored in the memory to implement a method for use with a print data input-image out operation. An on signal is received on the input generating control to allow print data to be inputted. An on signal is received on the output generating control to allow transformed print data to be stored or transmitted. Output is provided on the input counting control for counting a number of input documents. Output is also provided on the output counting control for counting the size of the output.

In another embodiment instructions may be stored in the memory to implement a method for an image input-paper output operation. An on signal is received on the input generating control to allow data to be inputted. An on signal is received on the output generating control to allow transformed print data to be stored or transmitted. Output is provided on the input counting control for counting a number of input documents. Output is also provided on the output counting control for counting the size of the output.

Another embodiment of an imaging device is also disclosed. The imaging device includes a processor and memory in electronic communication with the processor. An input device in electronic communication with the processor is also included. The imaging device also includes an output device in electronic communication with the processor. A communications interface is included that is in electronic communication with the processor for communicating with one or more computing devices. The imaging device also includes a vendor interface for enabling a pay-per-use device to be connected to the imaging device. The vendor interface is in electronic communication with the processor and also includes a plurality of external connectors that are controls. The vendor interface includes an input generating control that enables and disables input generating operations. The vendor interface also includes an output generating control that enables and disables output generating operations. An input counting control is included for counting the number of input generating impressions. The vendor interface further includes an output counting control for counting the number of output generating impressions.

Various embodiments of the invention are now described with reference to the Figures, where like reference numbers indicate identical or functionally similar elements. It will be readily understood that the embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

When a pay-per-use operator places an imaging device for pay-per-use access, the operator desires a single means for implementing the pay-per-use interface to the imaging device for all imaging operations. Traditionally, pay-per-use has been limited to walkup copier devices. These copiers are controlled by an external coin-operated (or other access control box) box that interfaces with a vendor specific interface on the device. The vendor interface is generally implemented as a serial port interface (e.g., DB-13). Each pin on the serial port controls some function of the device or reports actions taken by the device, such as:

1. One pin is used to enable/disable the print engine (e.g., voltage on pin is either hi or low).
2. Another pin is used to count clicks (e.g., a pulse is sent per click).
3. Other pins indicate special features, such as color, duplex, stapling, etc.

Generally, a coin-operated box would operate the vendor interface as follows:

1. Once money is placed in the box, a signal is sent to enable the print engine.
2. Each click count received, the box debits the current amount of money submitted.
3. When the money goes to zero, the box sends a signal to the print engine to disable.

This method has limitations in that (a) it only operates a copy function (it does not operate the print, scan, fax, publish, convert or image store functions), and (b) it does not distinguish how much of the output is the original copy vs. additional copies. This information might be used to charge a premium for the first copy out and a reduced price for each additional copy.

The vendor interface for the Sharp AR-507, as described in Sharp Support Bulletin, DVEND External Vendor Interface Kits, February 2001, is an example of a vendor interface that implements the above method.

In another method, control of the print operation to an imaging device is controlled by connecting an external box between the device's printer port and printer cable. In this manner, print data is forced to go through the external box. One way of using such a mechanism, is as follows:

1. Print jobs for the printer are placed on a centralized print queue (e.g., network print queue).
2. The external box communicates with an access/accounting control server.
3. When access is granted (such as paying money or authenticating the user), a message is sent from the access/control server to the centralized print queue, to release the print job.

The number of clicks may then be counted in a number of ways, such as:

1. Doing a pre-RIP estimate on the centralized print server prior to de-spooling. RIP stands for Raster Image Processor. A RIP is a process that takes imaging data (e.g., PDL) and converts it into a bitmap for printing.
2. Counting the clicks from the vendor interface.

The product Equitrac PAS using the server based port monitor pre-RIP, is an example of a commercial product that uses the above method in which the clicks are counted in a pre-RIP process.

This method still suffers in that:
1. It only operates a print function. It cannot operate the copy, scan, fax or image store functions.
2. It cannot be integrated with the copy function using a single vendor interface (i.e., requires two different methods).
3. It cannot distinguish how much of the output is the original copy vs. additional copies. This information might be used to charge a premium for the first copy out and a reduced price for each additional copy.

Therefore, there is a desire for an effective method that can provide a pay-per-use control of all imaging operations of a device from a single vendor interface.

The disclosed embodiments describe an efficient and effective system and method for providing a pay-per-use interface (e.g., vendor interface 101) for an imaging device 120 that controls all imaging operations. FIG. 1 is a block diagram illustrating an embodiment of the vendor interface 101 of an imaging device 120. The vendor interface 101 is typically part of the imaging device 120 to provide a pay-per-use interface, as will be more fully explained below.

The imaging device 120 may include fax capability and be connected to a telephone line 107 for such purposes. In addition, the imaging device 120 may also be connected to a computer network 109, or it may be connected directly to a computing device 102a. The imaging device 120 may include other interfaces including, but not limited to, a scan data interface 111, a web site interface 113 and a storage interface 115. The scan data interface 111 may be used to transfer scan data to and from the imaging device 120. The web site interface 113 may be used to publish to a web site (not shown). The storage interface 115 may be used to store or retrieve data or files from a storage device (e.g., a flash drive, a CD-ROM, a floppy disk, etc.).

The vendor device for pay-per-use 103 that will be connected to the vendor interface 101 may include an interface for connecting to a computing device 102b. A computing device 102b may be used to monitor, control, update, or otherwise interact and communicate with the vendor device for pay-per-use 103.

Figure 2:
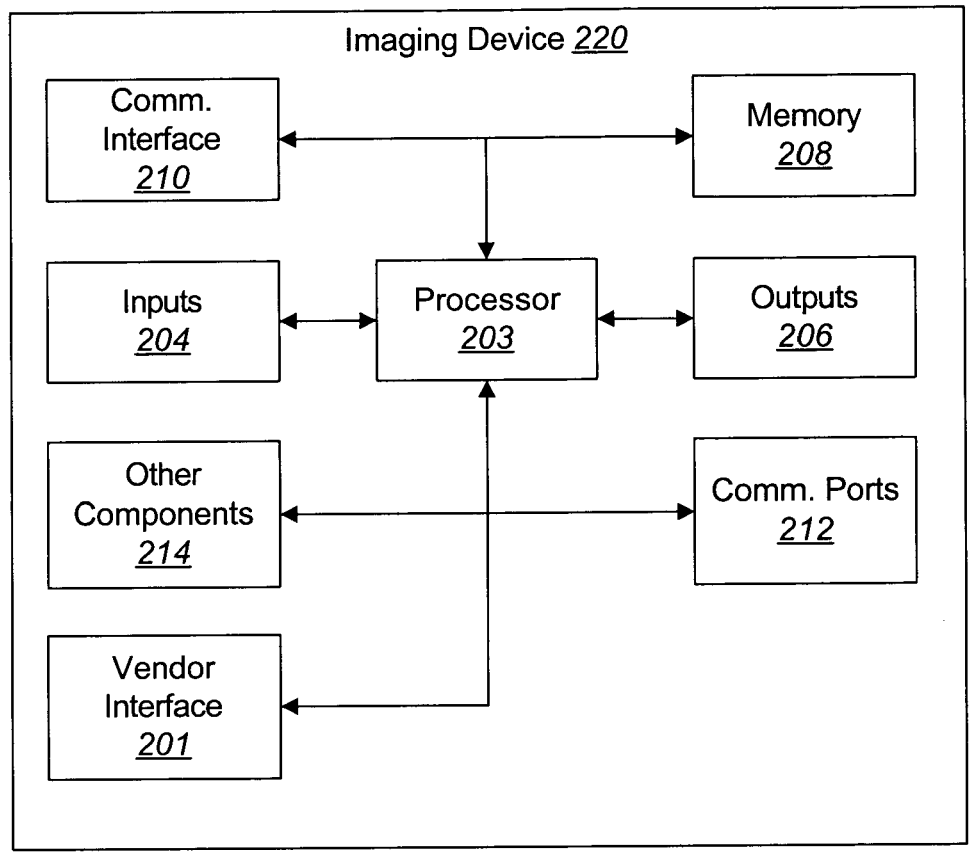
FIG. 2 is a block diagram illustrating the major hardware components typically utilized with embodiments of an imaging device with a vendor interface.

FIG. 2 is a block diagram illustrating the major hardware components typically utilized with embodiments of an imaging device 220 with a vendor interface 201. An imaging device 220 typically includes a processor 203 in electronic communication with input components or devices 204 and/or output components or devices 206.

The processor 203 controls the operation of the imaging device 220 and may be embodied as a microprocessor, a microcontroller, a digital signal processor (DSP) or other device known in the art. The processor 203 typically performs logical and arithmetic operations based on program instructions stored within the memory 208.

The processor 203 is operably connected to input 204 and/or output devices 206 capable of electronic communication with the processor 203, or, in other words, to devices capable of input and/or output in the form of an electrical signal. Embodiments of devices 220 may include the inputs 204, outputs 206 and the processor 203 within the same physical structure or in separate housings or structures. Examples of different kinds of input devices 204 include a keypad, keyboard, mouse, microphone, remote control device, button, joystick, trackball, touchpad, lightpen, etc. Examples of different kinds of output devices 206 include an LCD screen, speaker, etc.

The imaging device 220 may also include memory 208. The memory 208 may be a separate component from the processor 203, or it may be on-board memory 208 included in the same part as the processor 203. For example, microcontrollers often include a certain amount of on-board memory. As used herein, the term "memory" 208 is broadly defined as any electronic component capable of storing electronic information, and may be embodied as read only memory (ROM), random access memory (RAM), magnetic disk storage media, optical storage media, flash memory devices in RAM, on-board memory included with the processor 203, EPROM memory, EEPROM memory, registers, etc. The memory 208 typically stores program instructions and other types of data. The program instructions may be executed by the processor 203 to implement some or all of the methods disclosed herein.

The processor 203 is also in electronic communication with a communication interface 210. The communication interface 210 may be used for communications with computing devices 102, imaging devices 120, servers, etc. Thus, the communication interface 210 of the device 220 may be designed to communicate to send signals or messages between the computing devices 102. The communication interface 210 may be based on wired communication technology, wireless communication technology, or both. Examples of different types of communication interfaces 210 include a serial port, a parallel port, a Universal Serial Bus (USB), an Ethernet adapter, an IEEE 1394 bus interface, a small computer system interface (SCSI) bus interface, an infrared (IrDA) communication port, a Bluetooth wireless communication adapter, and so forth.

The imaging device 220 may also include other communication ports 212. In addition, other components 214 may also be included in the imaging device 220.

The imaging device 220 also includes the vendor interface 201. The vendor interface 201 will be more fully explained and illustrated below.

An imaging device 120 is a device that receives or transmits an imaging job, such as a Multi-Function Peripheral ("MFP") or computing device. Imaging devices 120 include, but are not limited to, physical printers, multi-functional peripherals, a printer pool, a printer cluster, a fax machine, a plotter, a scanner, a copier, a logical device, a computer monitor, a file, an electronic whiteboard, a document server, etc. The imaging device 120 may be a single or a plural grouping (e.g., pool or cluster) of two or more devices.

In light of the definition of an imaging device 120 above, the term imaging job, as used herein, is broadly defined as any instruction or set of instructions that are sent to an imaging device to cause an image to be printed, imaged, scanned, sent, filed, converted, published, etc., to or from the imaging device 120. Thus, the term imaging job includes, but is not limited to, a fax instruction or job to send a fax, a print job to print to a file, a print job to print to a particular window in a graphical user interface, a scan job to scan in an image from a scanner, a print job to print to a physical printer, a document manipulation job, a document conversion job, etc.

Figure 3:
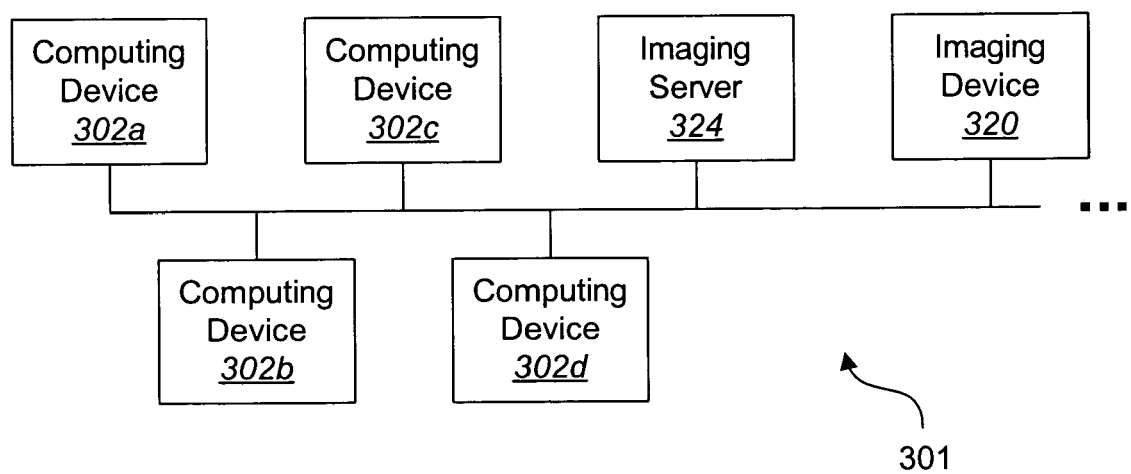
FIG. 3 is a network block diagram illustrating one possible environment in which the present systems and methods may be implemented.

FIG. 3 is a network block diagram illustrating one possible environment in which the present systems and methods may be implemented. The present systems and methods may also be implemented on a standalone computer system. FIG. 3 illustrates a computer network comprising a plurality of computing devices 302, an imaging device 320 and an imaging server 324.

Embodiments herein are independent of the job control command and image data language and syntax. For example, the job control language may be PJL and the imaging job data language may be PCL, Postscript, TIFF or PDF.

Herein, reference to computing devices that construct and despool an imaging job to, or receive from, either an imaging device or server, will be referred to as imaging clients. Herein, reference to computing devices that manage an imaging device and receive imaging jobs and respool the imaging job to/from an imaging device, will be referred to as imaging servers.

References to computing devices that construct and despool an imaging job to either an imaging device or server, will be referred to as client computing devices (i.e., client). Herein, reference to computing devices that centrally manage a shared imaging device by receiving despooled imaging jobs from multiple client computing devices and re-despools the imaging job to the imaging device, will be referred to as server computing devices (i.e., server).

The embodiments disclosed operate independently of how the imaging job is initiated. For example, a scan job may be initiated by an application using a scanner driver which spools a scan job to the print/scan spooler. By way of further example, the scan job may be initiated at the operations panel (e.g., front panel) of the imaging device.

The systems and methods herein are independent of the method to initiate the imaging job and the method to despool the image job and/or imaging result to/from the imaging client and imaging device.

The term "network" may refer to any combination of computing devices and peripherals, such as printing devices, wherein the devices can communicate with each other. The term "network" may comprise Local Area Networks (LANs), Wide Area Networks (WANs) and many other network types. A network may be connected using conventional conductive cable, fiber-optic cable, phone line cable, power line cable or other electrical and light conductors and other signal transmission media as well as wireless connections using infrared, RF or other wireless methods.

Embodiments may be embodied in software, firmware, hardware and other forms that achieve the function described herein. As embodiments may be adapted to many environments with varying computing devices, operating systems, printing devices, network hardware and software, applications and other variables, these embodiments may take many forms to achieve their function. Some embodiments may also be transmitted as signals, for example, and not by way of limitation, embodiments may be transmitted as analog or digital electrical signals or as light in a fiber-optic line. All of these embodiments are to be considered within the scope of the present invention.

Figure 4:
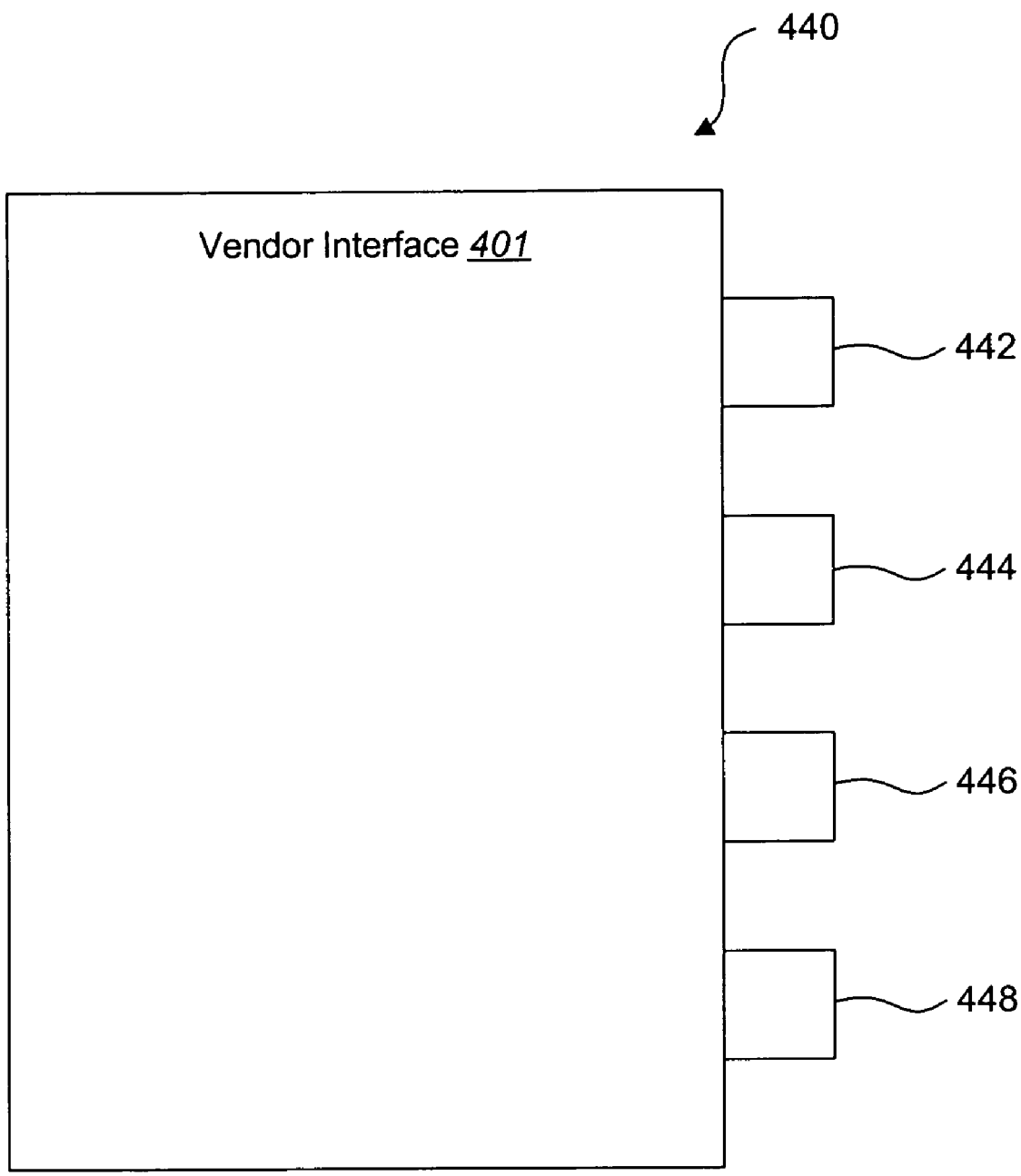
FIG. 4 is a general block diagram of a vendor interface.

FIG. 4 is a general block diagram of a vendor interface 401. The vendor interface includes four groups of controls 440. The controls 440 may be implemented through various ways. The controls in the embodiment of FIG. 4 will be illustrated and referred to as control pins. The controls pins (or other input controls) include input generating controls 442. The input generating controls 442 are for enabling/disabling input generating operations (e.g., scan, RIP, direct image input, etc.)

The vendor interface 401 also includes output generating controls 444. The output generating controls 444 are for enabling/disabling output generating operations (e.g., print engine, image send, etc.)

The vendor interface 401 also includes input counting controls 446. The input counting controls 446 are for counting the number of input generating impressions (e.g., page images).

The vendor interface 401 also includes output counting controls 448. The output counting controls 448 are for counting the number of output generating impressions (e.g., sheets printed, images sent).

Typically an imaging device 120 has a vendor interface 101 with an external connector, such as a DB-25, which can be used by an external device 103 connected to the vendor interface 101 to control and charge for imaging operations on the device 120. Examples of such external devices 103 include, but are not limited to, a coin-op box, a smart card reader (and writer for debiting from the card), a magnetic card reader (and writer for debiting from the card), and a credit card reader. The external connector of the interface 101 may be any type of communication port, such as, but not limited to a serial port (e.g., DB-25), a parallel port, a USB port, a wireless port (e.g., blue-tooth, Wi-Fi), an infrared port (e.g., IrDa), etc.

Control signaling across the port 101 may be implemented as either analog or digital signals. For example, control signals may use signaling including but not limited to voltage potential (hi and low voltage thresholds) to indicate a state (e.g., enable print engine), amplitude pulses (amplitude threshold) to indicate each occurrence of an event (e.g., page click), digital pulses to indicate a state or occurrence of an event, digital data to indicate a state or occurrence of an event, etc. The control signaling may also be achieved through use of an optical or magnetic interface, where a light signal or magnetic pulse result in a sensor that generates an electronic signal.

Figure 5:
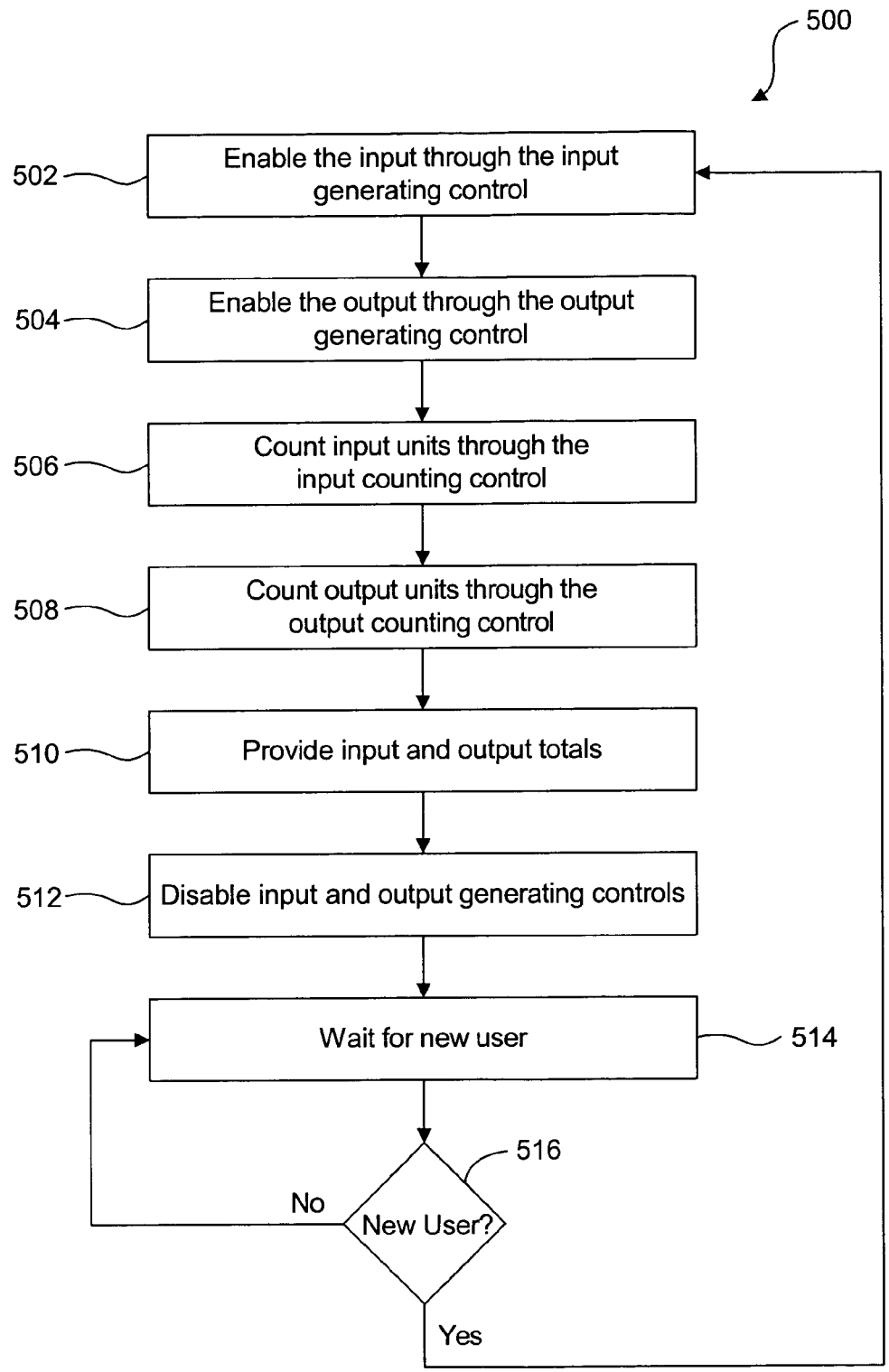
FIG. 5 is a flow diagram of an embodiment of a method for using a vendor interface to administer a pay-per-use system with an imaging device.

FIG. 5 is a flow diagram of an embodiment of a method 500 for using a vendor interface 101 to administer a pay-per-use system 103 with an imaging device 120. Since all imaging operations on a device 120 include some input to output transformation, any imaging operation can be controlled and charged by using one pin from each of the four categories 442, 444, 446, 448. That is, a pin is used to the control enabling the input 442, a pin is used to control enabling the output 444, another pin for counting the input impressions 446 and finally a pin for counting the output impressions 448.

The input is enabled 502 through the input generating control 442. The output is enabled 504 through the output generating control 444. Input units are counted 506 through the input counting control 446. In one embodiment the input units may be pages.

Output units are counted 508 through the output counting control 448. The input and output totals may be provided 510 so that the amount owed or due from the use may be calculated. After the totals have been calculated, the input and output generating controls are disabled 512 before the next new user. The process may then wait 514 for a new user. When it is determined 514 that a new user is ready to use the imaging device 120, the process may return to the enabling portion of the method and continue as shown and explained.

This method may be adapted for use with various specific kinds of imaging devices. For example, a walkup copy operation could be controlled as follows:

Enable 502 the scan controller for input
Enable 504 the print engine for output
Count 506 scan impression clicks to determine the size of the original copy.
Count 508 print impression clicks to determine the total output size.

By way of further example, a print from desktop operation could be controlled as follows:

Enable 502 the print controller (RIP processing) for input
Enable 504 the print engine for output
Count 506 RIP impression clicks to determine the size of the original copy.
Count 508 print impression clicks to determine the total output size.

A still yet further example, a scan to desktop (network scan) could be controlled as follows:

Enable 502 the scan controller for input
Enable 504 the image send for output
Count 506 scan impression clicks to determine the size of the original copy.
Count 508 image send impression clicks to determine the total number of images transmitted.

This method also applies to other imaging operations, such as fax in/out, internet fax, print from digital camera, image store, document conversion, publish to web, etc.

Figure 6:
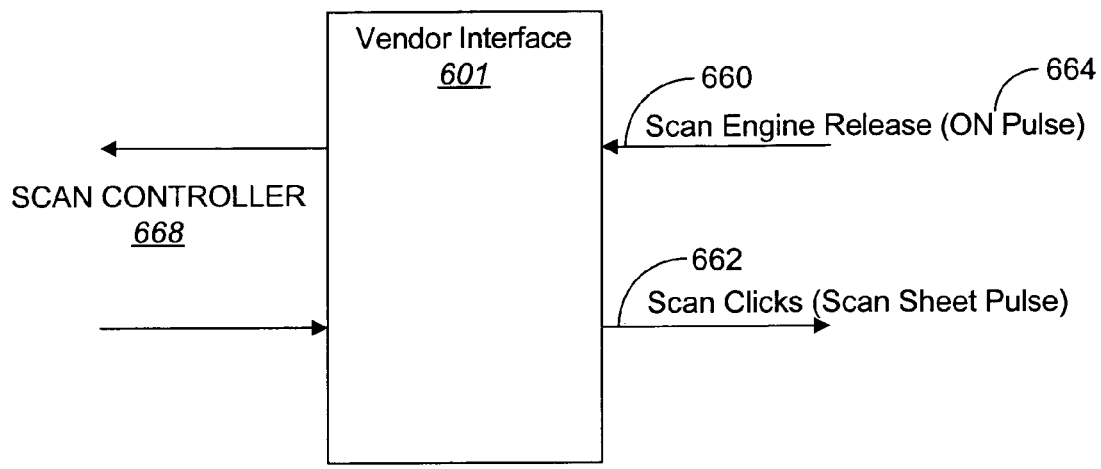
FIG. 6 is a block diagram illustrating start and stop operations for a vendor interface for a scanner.
Figure 6:
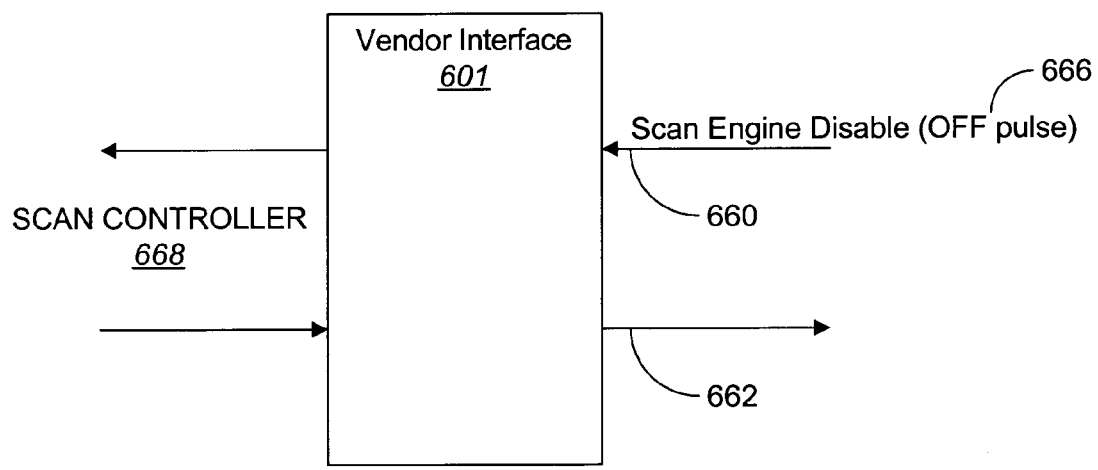

FIG. 6 is a block diagram illustrating start and stop operations for a vendor interface 601 for a scanner (not shown). In these embodiments the input is scan input from the scanner. The vendor interface 601 for the scanner illustrated in FIG. 6 includes a pin 660 for enabling/disabling the scanner unit (e.g., allowing hard-copy input to be scanned into scanned image data), referred to as the scan engine release. Another pin 662 for counting the number of generated scan impressions (e.g., number of sheet surfaces that were scanned) is also included, referred to as scan clicks.

When an ON signal 664 is sent on the scan engine release pin 660, the scanner controller 668 allows the scanner unit to operate. When an OFF signal 666 is sent, the scan controller 668 disables the scanner unit (e.g., the user can not scan documents into the device). This pin 660 can be used by a coin-op (or other) box to enable/disable the scanner unit.

When operating, each image produced (e.g., scanned sheet surface) by the scanner unit generates a scan impression pulse on the scan clicks pin 662. This pin 662 can be read by a coin-op (or other) box to count the number of scan impressions produced.

Figure 7:
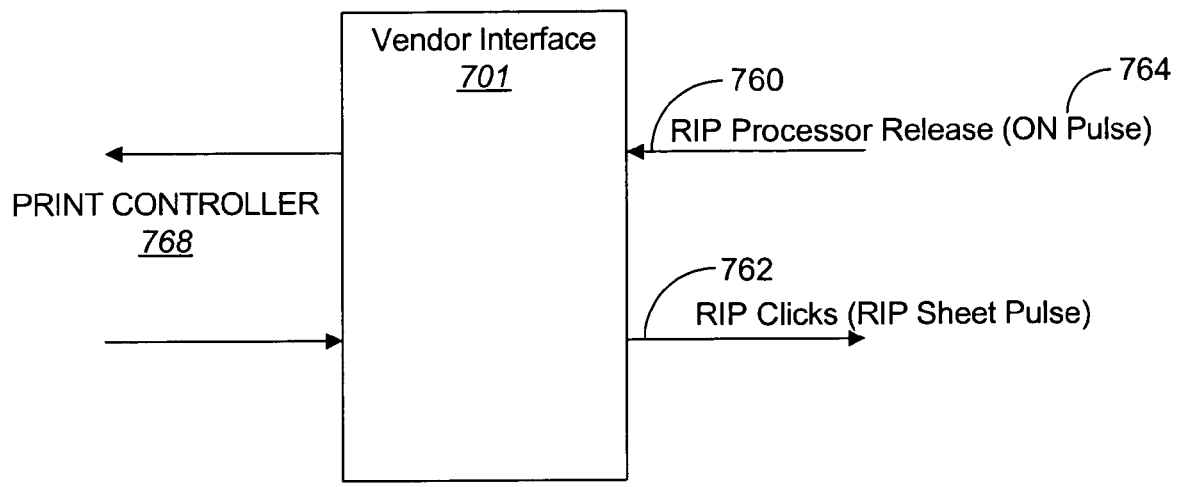
FIG. 7 is a block diagram illustrating operations performed by a vendor interface for a RIP in print controller.
Figure 7:
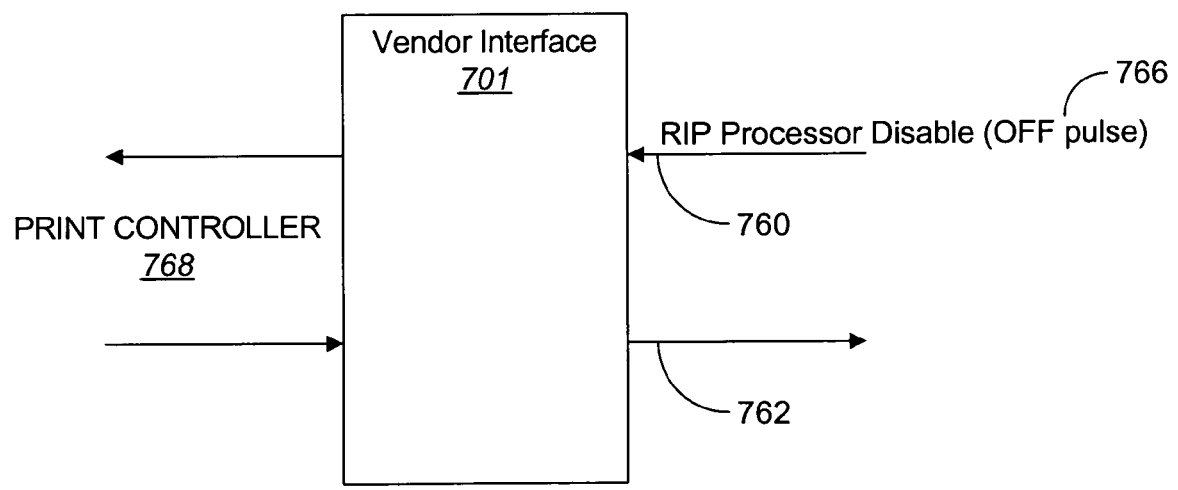

FIG. 7 is a block diagram illustrating operations performed by a vendor interface 701 for a RIP in print controller. A vendor interface 701 for RIP in Print Controller (Print/Fax Data or Direct Image input) is illustrated. The vendor interface 701 for the raster image processor (RIP) includes a pin 760 for enabling/disabling the RIP processor (e.g., allowing interpretation/RIP of print data into engine ready data for print or scanned data for fax, or direct input of engine ready or scanned data ~direct print), referred to as the RIP processor release 760. A second pin 762 is used to for counting the number of generated RIP impressions (e.g., number of raster sheet-surface images that were generated), referred to as RIP clicks 762.

When an ON signal 764 is sent on the RIP processor release pin 760, the print controller 768 allows the conversion of print or fax data, or direct image input (e.g., such as from a digital camera), into engine or fax ready data. When an OFF signal 766 is sent, the print controller 768 disables the RIP processing (e.g., print data is not converted). This pin 760 can be used by a coin-op (or other) box to enable/disable RIP processing.

When operating, each image produced by the RIP generates a RIP sheet pulse on the RIP clicks pin 762. This pin 762 can be read by a coin-op (or other) box to count the number of RIP impressions produced.

Figure 8:
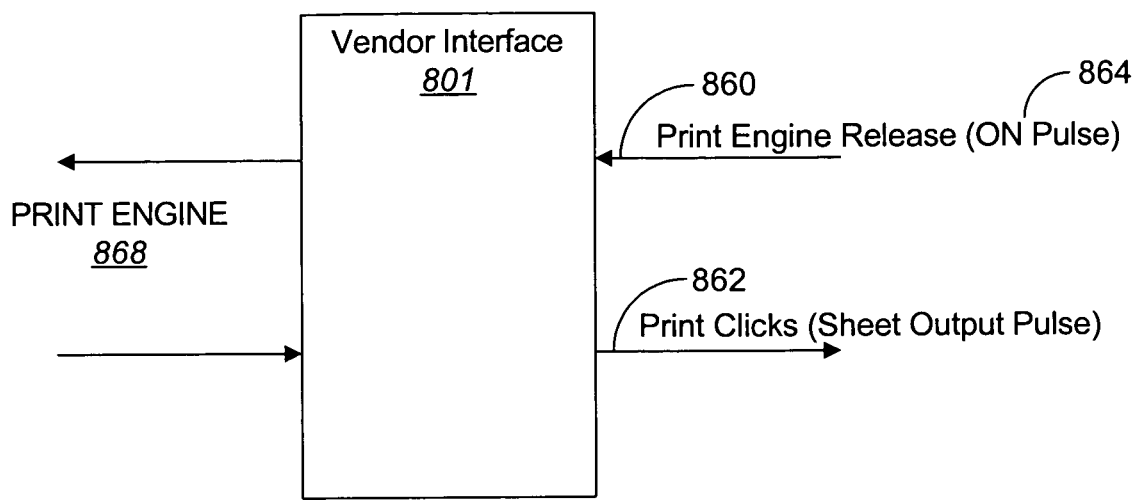
FIG. 8 is a block diagram illustrating operations performed by a vendor interface for a print engine.
Figure 8:
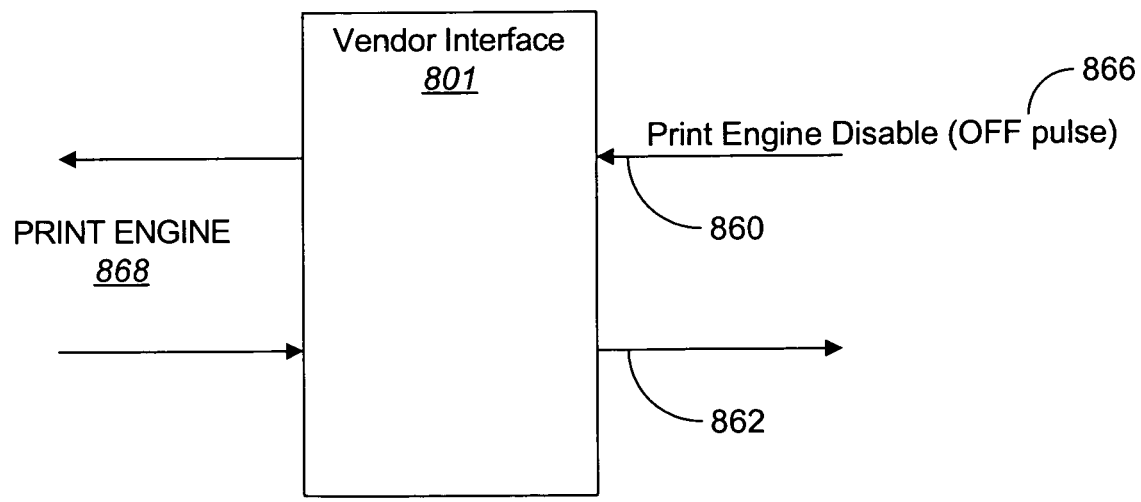

FIG. 8 is a block diagram illustrating operations performed by a vendor interface 801 for a print engine 868. A vendor interface 801 for a print engine 868 (copy, print or fax paper output) is shown. The vendor interface 801 for the print engine 868 consists of a pin 860 for enabling/disabling the print engine (e.g., allowing raster images to be printed on sheets of paper which are then outputted), referred to as the print engine release 860. There is also a pin 862 for counting the number of generated print impressions (e.g., number of sheet surfaces which were printed), referred to as the print clicks 862.

When an ON signal 864 is sent on the print engine release pin 860, the print engine 868 allows raster images to be developed/fused onto sheets of paper (or other hard media). When an OFF signal 866 is sent, the print engine 868 disables the printing of sheets (e.g., printed material is not developed/fused).

Figure 9:
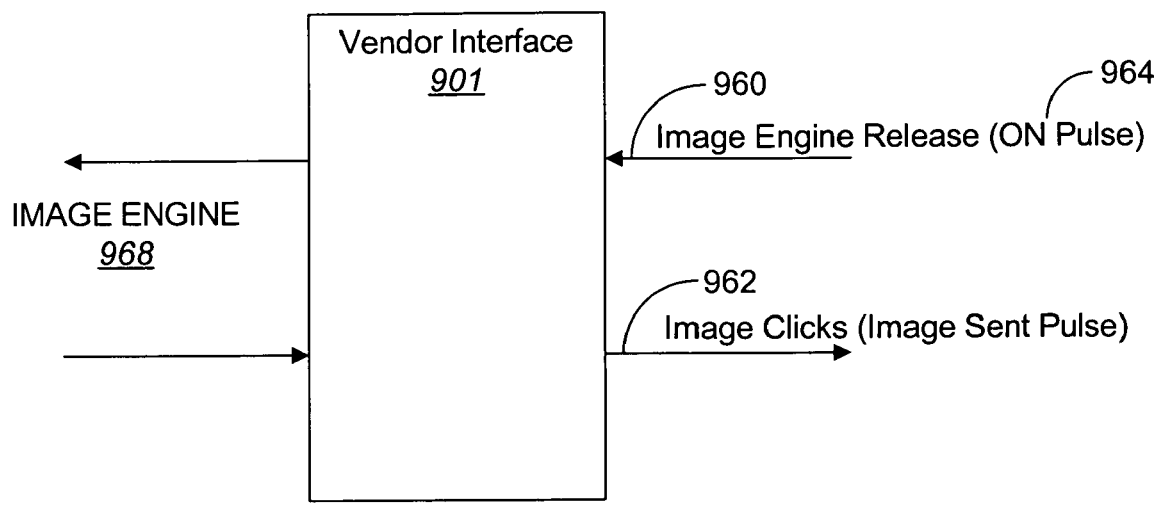
FIG. 9 is a block diagram illustrating operations performed by a vendor interface for image transmission.
Figure 9:
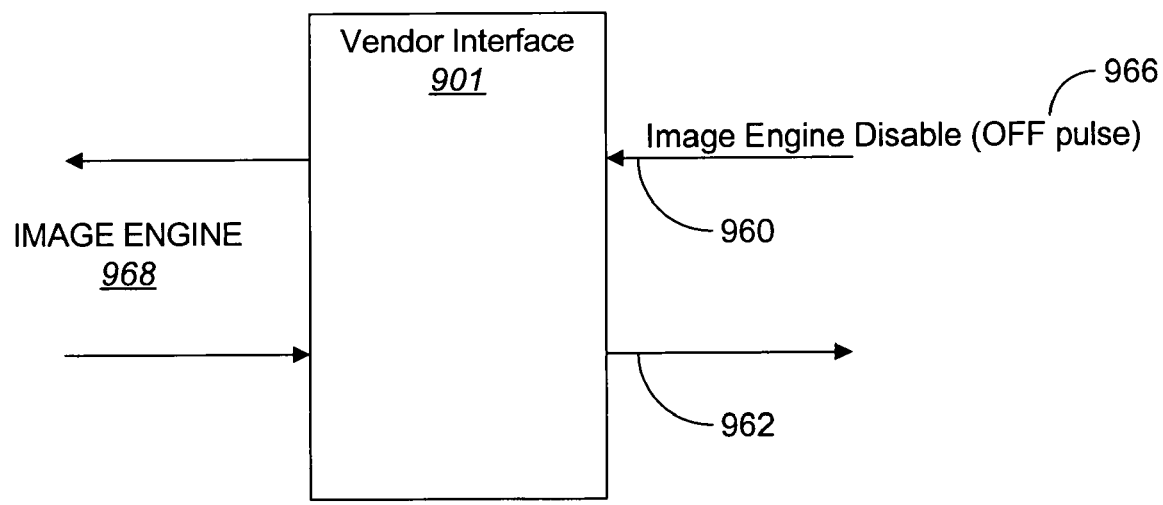

FIG. 9 is a block diagram illustrating operations performed by a vendor interface 901 for image transmission. A vendor interface 901 for an image send (e.g., fax, network scan or image store output, publish to web) is illustrated. The vendor interface 901 for the image send unit includes a pin 960 for enabling/disabling the image send unit from transmitting, or storage, of images (e.g., sending a facsimile transmission, internet fax or scan to desktop), referred to as the image engine release 960. A pin 962 is also included for counting the number of transmitted images (e.g., number of sheet surface images which were transmitted), referred to as image clicks 962.

When an ON signal 964 is sent on the image engine release pin 960, the image engine 968 allows image data to be stored (e.g., store to disk, local media, etc) or sent (e.g., by ftp or email to a desktop, or facsimile transmission via a fax modem). When an OFF signal 966 is sent, the image engine 968 disables the transmission or storage of images.

Figure 10:
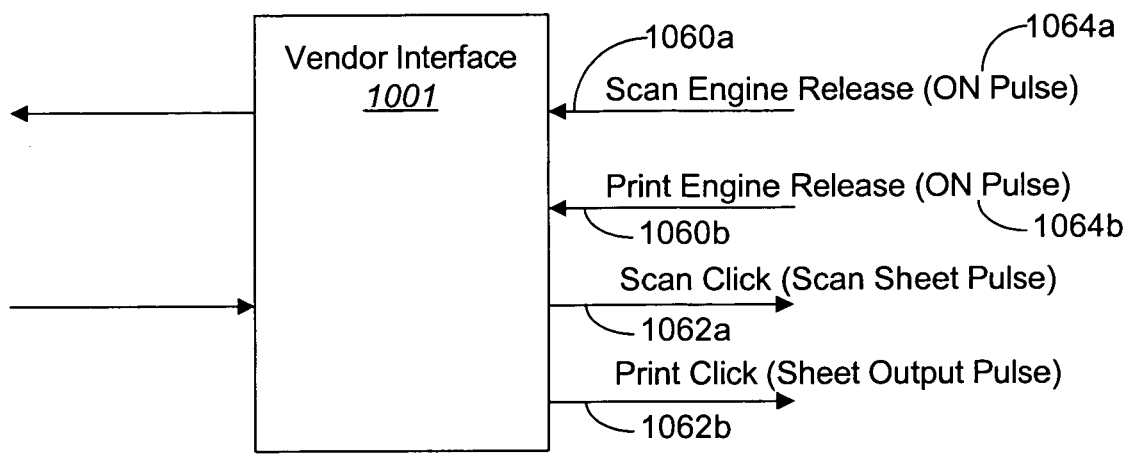
FIG. 10 is a block diagram illustrating operations performed by a vendor interface for a copy operation (paper input and paper output)

FIG. 10 is a block diagram illustrating operations performed by a vendor interface 1001 for a copy operation (paper input and paper output). In this embodiment, imaging operations, which are categorized as an input to output, can be controlled through one input generating pin and one output generating pin. The charging (accounting) can be calculated from one input generated impressions pin and one output generated impressions pin.

In this embodiment a copy operation is controlled and cost calculated through the vendor interface 1001 by:
  1. Sending an ON signal 1064a to the scan engine release 1060a to allow hard-copy input to be scanned in.
  2. Sending an ON signal 1064b to the print engine release 1060b to allow printed material to be generated and outputted.
  3. Clicks counted on the scan click pin 1062a determine the size of the original input document(s).
  4. Clicks counted on the print click pin 1062b determine the total size of the output.

The counting of both the input and output clicks gives the operator the ability to charge one price for the first copy out (i.e., size of input) and another (e.g., reduced) charge for additional copies made thereafter.

Figure 11:
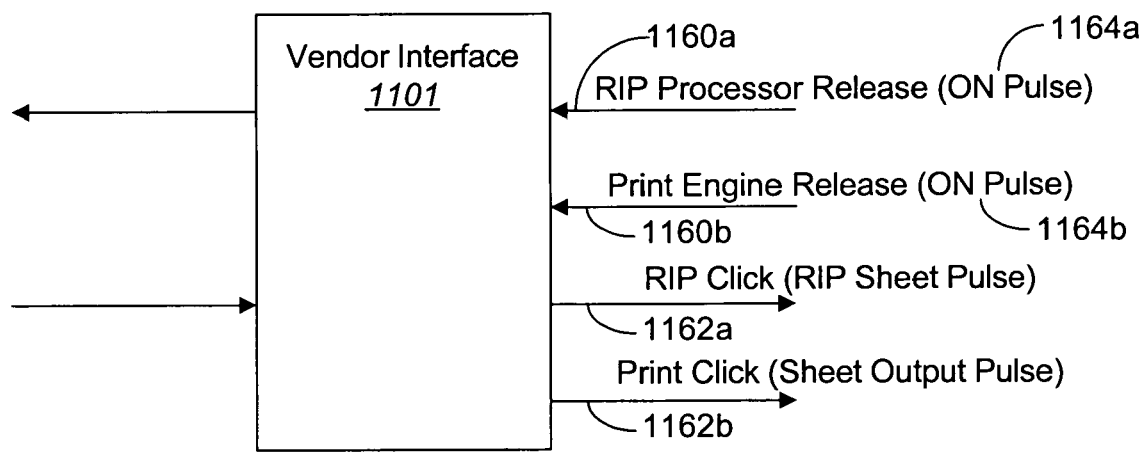
FIG. 11 is a block diagram illustrating operations performed by a vendor interface for a print operation (print data is input with paper output)

FIG. 11 is a block diagram illustrating operations performed by a vendor interface 1101 for a print operation (print data is input with paper output). A print operation is controlled and cost calculated through the vendor interface 1101 by:
  1. Sending an ON signal 1164a to the RIP processor release 1160a to allow print data to be inputted (e.g., from a printer port) and transformed into engine ready data.
  2. Sending an ON signal 1164b to the print engine release 1160b to allow printed material to be generated and outputted.
  3. Clicks counted on the RIP click pin 1162a determine the size of the original input document(s).
  4. Clicks counted on the print click pin 1162b determine the total size of the output.

Figure 12:
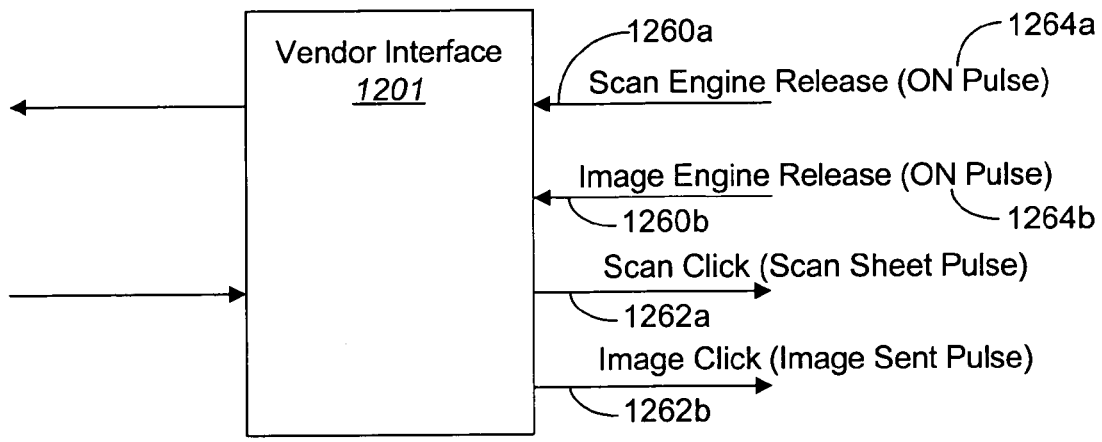
FIG. 12 is a block diagram illustrating operations performed by a vendor interface for a paper in-image out operation.

FIG. 12 is a block diagram illustrating operations performed by a vendor interface 1201 for a paper in-image out operation. Examples of paper in image out operations include fax out, network scan and/or or image store. A hard-copy fax out, network scan or scan to image store operation is controlled and cost calculated through the vendor interface 1201 by:
  1. Sending an ON signal 1264a to the scan engine release 1260a to allow hard-copy input to be scanned in.
  2. Sending an ON signal 1264b to the image engine release 1260b to allow the scanned data to be converted to an appropriate data format and stored or transmitted (e.g., via ftp, email, facsimile).
  3. Clicks counted on the scan click pin 1262a determine the size of the original input document(s).
  4. Clicks counted on the image click pin 1262b determine the total size of the output.

Figure 13:
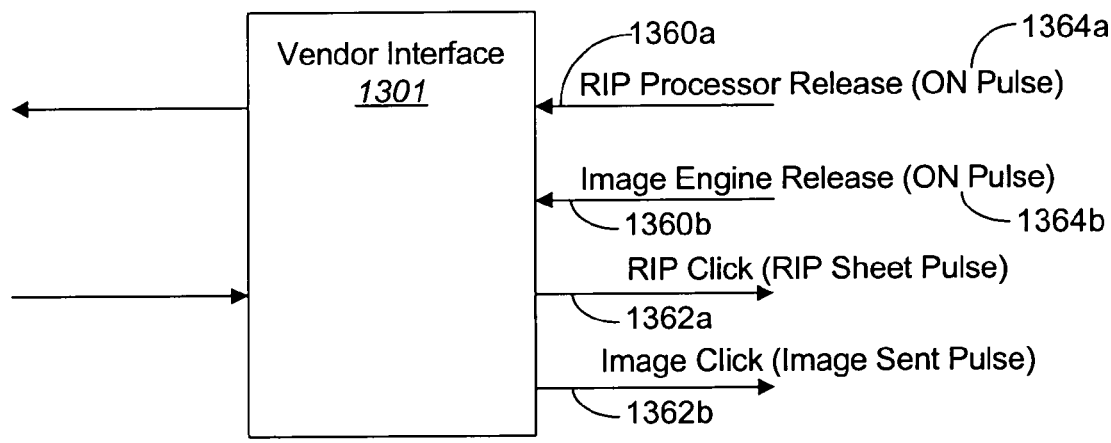
FIG. 13 is a block diagram illustrating operations performed by a vendor interface for print data input-image output.

FIG. 13 is a block diagram illustrating operations performed by a vendor interface 1301 for print data input-image output. Examples of print data input-image output include, but are not limited to, print to fax and print to image store. A print to fax (e.g., PC Fax) or print to image store operation is controlled and cost calculated through the vendor interface 1301 by:
  1. Sending an ON signal 1364a to the RIP processor release 1360a to allow print data to be inputted (e.g., from a printer port) and transformed into engine or fax ready data.
  2. Sending an ON signal 1364b to the image engine release 1360b to allow the engine or fax ready data to be stored or transmitted (e.g., via ftp, email, facsimile).
  3. Clicks counted on the RIP click pin 1362a determine the size of the original input document(s).
  4. Clicks counted on the image click pin 1362b determine the total size of the output.

Figure 14:
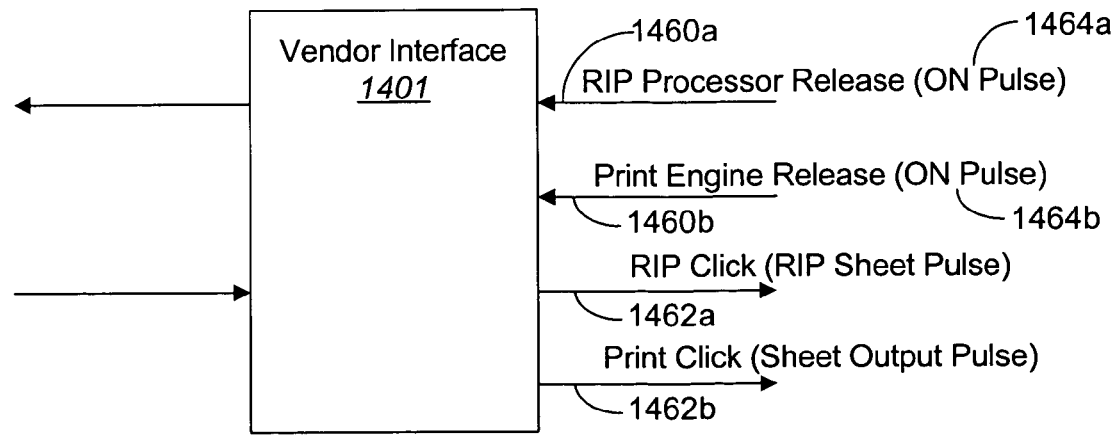
FIG. 14 is a block diagram illustrating operations performed by a vendor interface for an image input-paper output operation.

FIG. 14 is a block diagram illustrating operations performed by a vendor interface 1401 for an image input-paper output operation. An example of an image input-paper output operation includes fax in to print operation. A fax in to print (e.g., printing a received fax) is controlled and cost calculated through the vendor interface 1401 by:
  1. Sending an ON signal 1464a to the RIP processor release 1460a to allow the facsimile image data to be inputted (e.g., from fax modem) and transformed into engine ready data.
  2. Sending an ON signal 1464b to the print engine release 1460b to allow printed material to be generated and outputted
  3. Clicks counted on the RIP click pin 1462a determine the size of the original input document(s).
  4. Clicks counted on the print click pin 1462b determine the total size of the output.

The principles and features disclosed in the above embodiments may also be used with any imaging operation not mentioned that takes hard or soft media as input and produces a hard or soft media output. Other embodiments include any imaging device capable of performing an input to output imaging operation, including, but not limited to: copier, printer, scanner, facsimile device, document/image server, MFP, CD burner, electronic whiteboard, tablet PC, publishing device, and digital camera.

Further embodiments of a vendor interface may also include additional pins for finer resolution for accounting and control. For example, additional pins (or signals) could be used to indicate special processing features, such as:
  1. Color vs. BW
  2. Duplex
  3. Stapling, Hole Punch, Folding
  4. Paper Size and Stock
  5. Area Codes (for fax transmissions)
  6. Image Size
  7. Toner Usage Additional pins may be used to further refine the imaging operation that generates the output. For example, pins for click counting could be assigned to specific imaging operations, such as, but not limited to:
  1. Print
  2. Copy
  3. Network Scan
  4. Image Store
  5. Fax In
  6. Fax Out
  7. Document Conversion
  8. Publish Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. An imaging device comprising:
    a processor;
    memory in electronic communication with the processor; and
    a vendor interface for enabling a pay-per-use device to be connected to the imaging device, wherein the vendor interface is in electronic communication with the processor, and wherein the vendor interface comprises:
        an input generating control that enables and disables input generating operations;
        an output generating control that enables and disables output generating operations;
        an input counting control for counting the number of input generating impressions; and
        an output counting control for counting the number of output generating impressions.

2. The imaging device of claim 1, wherein the imaging device is selected from the group consisting of a printer, a facsimile device, a copier, a scanner, a display monitor, an imagesetter, a platesetter, an image store, a publishing device, and a multi-function peripheral device.

3. The imaging device of claim 1, wherein the imaging device includes a scanner, and further comprising instructions stored in the memory, the instructions being executable to implement a method comprising:
    receiving an on signal on the input generating control;
    enabling the scanner;
    providing output on the input counting control for counting a number of scan impressions;
    receiving an off signal on the input generating control; and
    disabling the scanner.

4. The imaging device of claim 1, further comprising instructions stored in the memory, the instructions being executable to implement a method for use with a raster image processor (RIP) in a print controller comprising:
    receiving an on signal on the input generating control;
    enabling the raster image processor;
    providing output for counting a number of generated RIP impressions;
    receiving an off signal on the input generating control; and
    disabling the raster image processor.

5. The imaging device of claim 1, further comprising instructions stored in the memory, the instructions being executable to implement a method for use with a print engine comprising:
    receiving an on signal on the input generating control;
    enabling the print engine;
    providing output on the output counting control for counting a number of print impressions;
    receiving an off signal on the input generating control; and
    disabling the print engine.

6. The imaging device of claim 1, further comprising instructions stored in the memory, the instructions being executable to implement a method for use with an image transmission comprising:
    receiving an on signal on the input generating control;
    enabling the image engine;
    providing output on the output counting control for counting a number of transmitted images;
    receiving an off signal on the input generating control; and
    disabling the image engine.

7. The imaging device of claim 1, further comprising instructions stored in the memory, the instructions being executable to implement a method for use with a copy operation comprising:
receiving an on signal on the input generating control to allow hard-copy input to be scanned;
receiving an on signal on the output generating control to allow printed material to be generated;
providing output on the input counting control for counting a number of input documents; and
providing output on the output counting control for counting a number of printed pages.

8. The imaging device of claim 1, further comprising instructions stored in the memory, the instructions being executable to implement a method for use with a print operation where print data is input and paper is output, the method comprising:
receiving an on signal on the input generating control to allow print data to be inputted;
receiving an on signal on the output generating control to allow printed material to be generated;
providing output on the input counting control for counting a number of input documents; and
providing output on the output counting control for counting a number of printed pages.

9. The imaging device of claim 1, further comprising instructions stored in the memory, the instructions being executable to implement a method for a paper in-image out operation comprising:
receiving an on signal on the input generating control to allow hard-copy input to be scanned;
receiving an on signal on the output generating control to allow scanned data to be converted to a data format and stored or transmitted;
providing output on the input counting control for counting a number of input documents; and
providing output on the output counting control for counting the size of the output.

10. The imaging device of claim 1, further comprising instructions stored in the memory, the instructions being executable to implement a method for a print data input-image out operation comprising:
receiving an on signal on the input generating control to allow print data to be inputted;
receiving an on signal on the output generating control to allow transformed print data to be stored or transmitted;
providing output on the input counting control for counting a number of input documents; and
providing output on the output counting control for counting the size of the output.

11. The imaging device of claim 1, further comprising instructions stored in the memory, the instructions being executable to implement a method for an image input-paper output operation comprising:
receiving an on signal on the input generating control to allow data to be inputted;
receiving an on signal on the output generating control to allow transformed data to be stored or transmitted;
providing output on the input counting control for counting a number of input documents; and
providing output on the output counting control for counting the size of the output.

12. An imaging device comprising:
a processor;
memory in electronic communication with the processor;
an input device in electronic communication with the processor;
an output device in electronic communication with the processor;
a communications interface in electronic communication with the processor for communicating with one or more computing devices; and
a vendor interface for enabling a pay-per-use device to be connected to the imaging device, wherein the vendor interface is in electronic communication with the processor, and wherein the vendor interface includes a plurality of external connectors that are controls, wherein the vendor interface comprises:
an input generating control that enables and disables input generating operations;
an output generating control that enables and disables output generating operations;
an input counting control for counting the number of input generating impressions; and
an output counting control for counting the number of output generating impressions.

13. The imaging device of claim 12, wherein the imaging device is selected from the group consisting of a printer, a facsimile device, a copier, a scanner, a display monitor, an imagesetter, a platesetter, an image store, a publishing device, and a multi-function peripheral device.

14. The imaging device of claim 12, wherein the imaging device includes a scanner, and further comprising instructions stored in the memory, the instructions being executable to implement a method comprising:
receiving an on signal on the input generating control;
enabling the scanner;
providing output on the input counting control for counting a number of scan impressions;
receiving an off signal on the input generating control; and
disabling the scanner.

15. The imaging device of claim 12, further comprising instructions stored in the memory, the instructions being executable to implement a method for use with a raster image processor (RIP) in a print controller comprising:
receiving an on signal on the input generating control;
enabling the raster image processor;
providing output for counting a number of generated RIP impressions;
receiving an off signal on the input generating control; and
disabling the raster image processor.

16. The imaging device of claim 12, further comprising instructions stored in the memory, the instructions being executable to implement a method for use with a print engine comprising:
receiving an on signal on the input generating control;
enabling the print engine;
providing output on the output counting control for counting a number of print impressions;
receiving an off signal on the input generating control; and
disabling the print engine.

17. The imaging device of claim 12, further comprising instructions stored in the memory, the instructions being executable to implement a method for use with an image transmission comprising:
receiving an on signal on the input generating control;
enabling the image engine;
providing output on the output counting control for counting a number of transmitted images;
receiving an off signal on the input generating control; and
disabling the image engine.

18. The imaging device of claim 12, further comprising instructions stored in the memory, the instructions being executable to implement a method for use with a copy operation comprising:

receiving an on signal on the input generating control to allow hard-copy input to be scanned;

receiving an on signal on the output generating control to allow printed material to be generated;

providing output on the input counting control for counting a number of input documents; and providing output on the output counting control for counting a number of printed pages.

19. The imaging device of claim 12, further comprising instructions stored in the memory, the instructions being executable to implement a method for use with a print operation where print data is input and paper is output, the method comprising:

receiving an on signal on the input generating control to allow print data to be inputted;

receiving an on signal on the output generating control to allow printed material to be generated;

providing output on the input counting control for counting a number of input documents; and providing output on the output counting control for counting a number of printed pages.

20. The imaging device of claim 12, further comprising instructions stored in the memory, the instructions being executable to implement a method for a paper in-image out operation comprising:

receiving an on signal on the input generating control to allow hard-copy input to be scanned;

receiving an on signal on the output generating control to allow scanned data to be converted to a data format and stored or transmitted;

providing output on the input counting control for counting a number of input documents; and providing output on the output counting control for counting the size of the output.

21. The imaging device of claim 12, further comprising instructions stored in the memory, the instructions being executable to implement a method for a print data input-image out operation comprising:

receiving an on signal on the input generating control to allow print data to be inputted;

receiving an on signal on the output generating control to allow transformed print data to be stored or transmitted;

providing output on the input counting control for counting a number of input documents; and providing output on the output counting control for counting the size of the output.

22. The imaging device of claim 12, further comprising instructions stored in the memory, the instructions being executable to implement a method for an image input-paper output operation comprising:

receiving an on signal on the input generating control to allow data to be inputted;

receiving an on signal on the output generating control to allow transformed data to be stored or transmitted;

providing output on the input counting control for counting a number of input documents; and providing output on the output counting control for counting the size of the output.

\* \* \* \* \*